(12) United States Patent
Boutin et al.

(10) Patent No.: US 9,643,675 B2
(45) Date of Patent: May 9, 2017

(54) ATTACHMENT SYSTEM AND METHOD OF USING THE SAME

(71) Applicant: Soucy International Inc., Drummondville (CA)

(72) Inventors: Jimmy Boutin, Upton (CA); Normand Roy, St-Hugues (CA); Mathieu Vincent, Drummondville (CA); Philippe Jaillet-Gosselin, Drummondville (CA); Geneviève Therrien, Drummondville (CA); Vincent Morin, Saint-Hyacinthe (CA); Julie Tremblay, Drummondville (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 266 days.

(21) Appl. No.: 14/286,002

(22) Filed: May 23, 2014

(65) Prior Publication Data

US 2014/0346784 A1 Nov. 27, 2014

Related U.S. Application Data

(60) Provisional application No. 61/827,299, filed on May 24, 2013.

(51) Int. Cl.
| | | |
|---|---|---|
| *E05C 3/02* | (2006.01) | |
| *B62J 9/00* | (2006.01) | |
| *B62J 7/04* | (2006.01) | |
| *B62K 5/01* | (2013.01) | |

(52) U.S. Cl.
CPC ............... *B62J 9/001* (2013.01); *B62J 7/04* (2013.01); *B62K 5/01* (2013.01); *Y10T 292/1043* (2015.04)

(58) Field of Classification Search
CPC ............ E05B 65/0858; E05B 65/0811; Y10T 292/0862; Y10T 70/8541; Y10T 74/18792; E05C 19/10; Y10S 292/53
USPC .................... 292/194, 112, 116–118
See application file for complete search history.

(56) References Cited

U.S. PATENT DOCUMENTS

| | | | | |
|---|---|---|---|---|
| 5,516,162 A * | 5/1996 | Takaishi | ............... | E05B 63/127 292/34 |
| 2011/0296880 A1* | 12/2011 | Sieglaar | ............... | E05B 13/108 70/100 |

* cited by examiner

*Primary Examiner* — Mark Williams
(74) *Attorney, Agent, or Firm* — BCF LLP

(57) ABSTRACT

An attachment system for securing an accessory to a vehicle is disclosed. The attachment system generally comprises at least a locking mechanism mountable to, or integral with, the accessory, and a base mounted to, or integral with, the vehicle. The locking mechanism generally comprises an actuator configured to actuate or displace at least a pair of locking elements between an inoperative (or unlocked) position and an operative (or locked) position. The base generally comprises at least one opening configured to at least partially receive the locking mechanism. The attachment system generally allows the installation and removal of the accessory by actuating the actuator of the at least one locking mechanism.

20 Claims, 15 Drawing Sheets

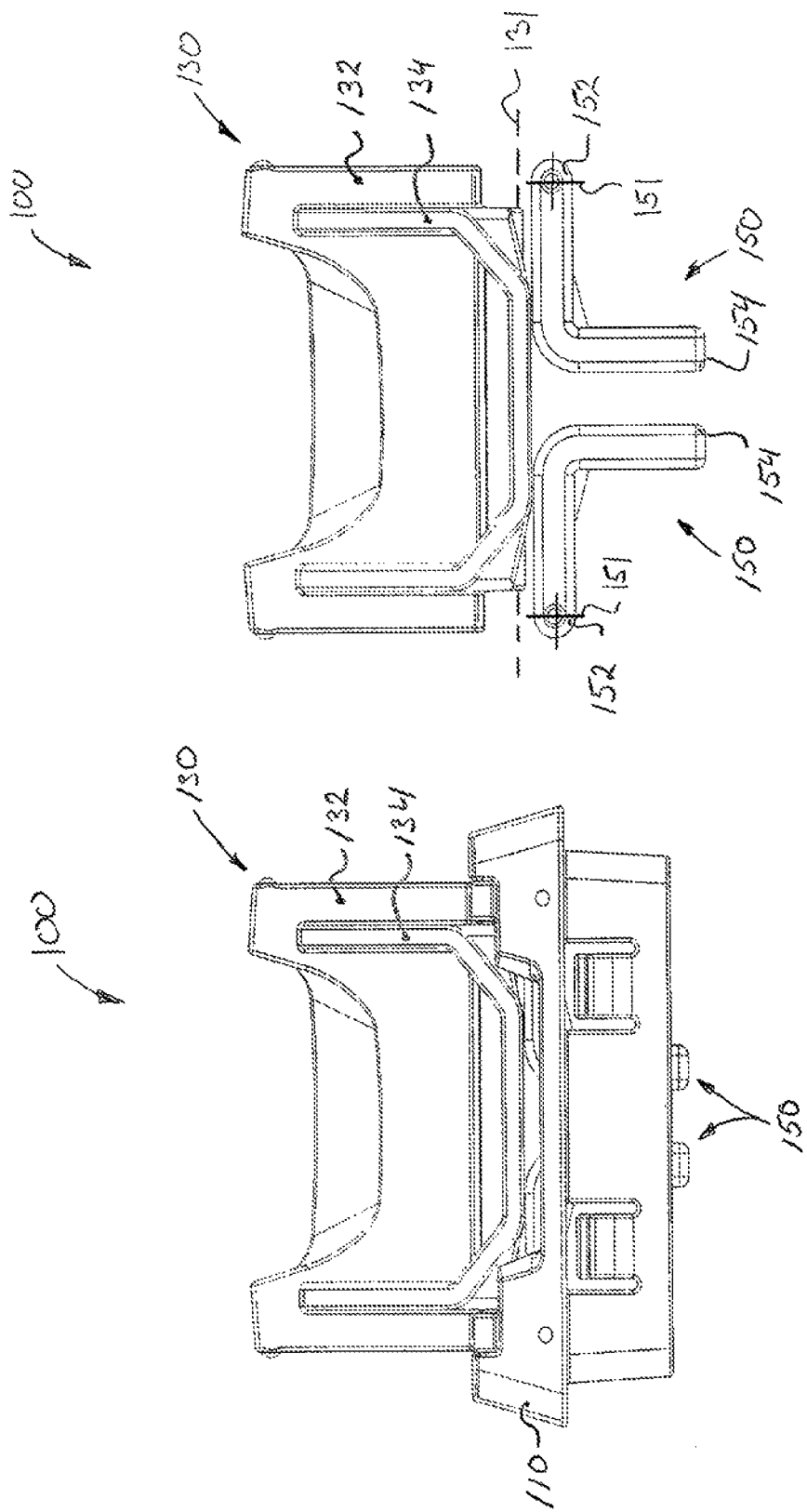

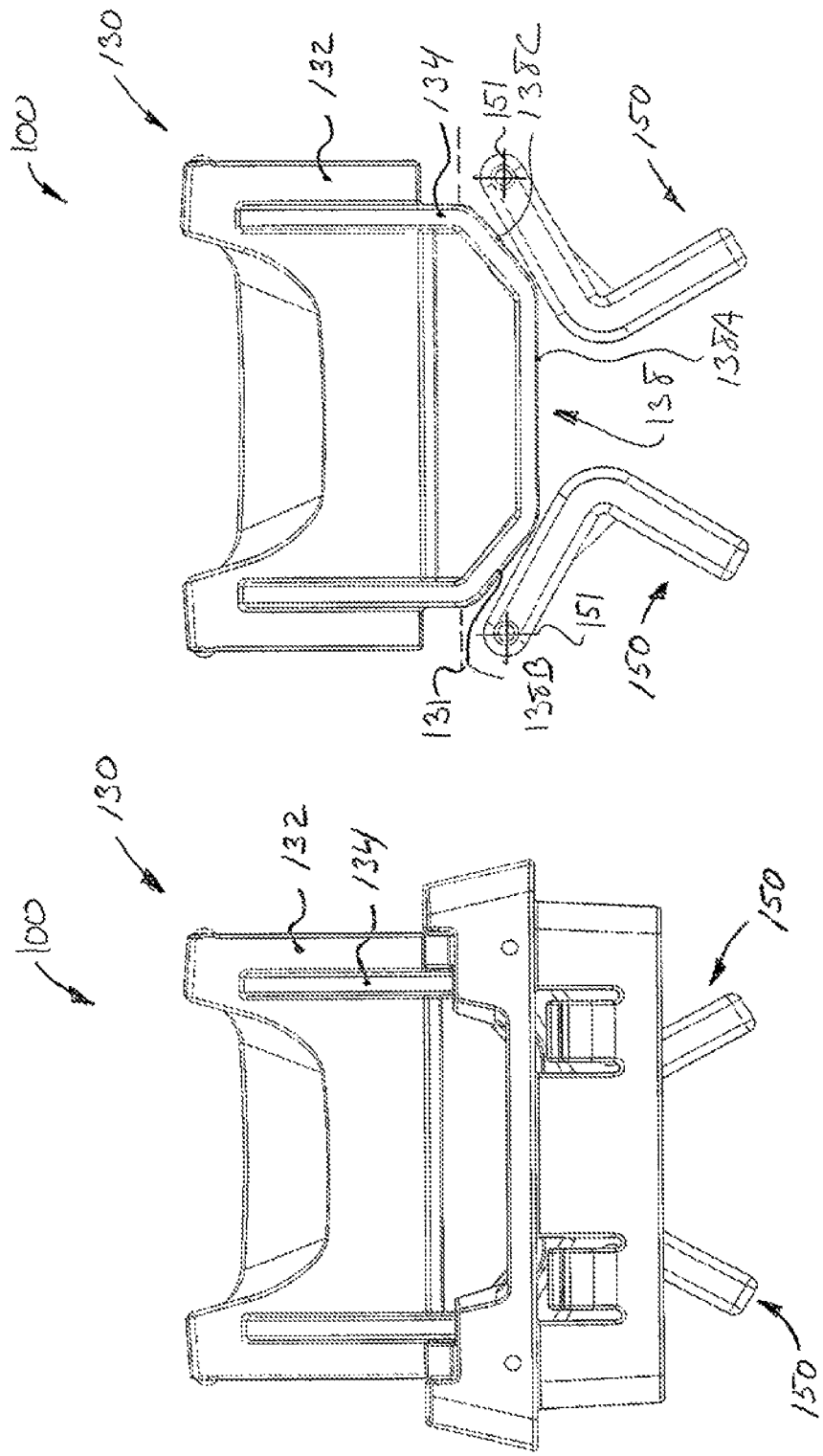

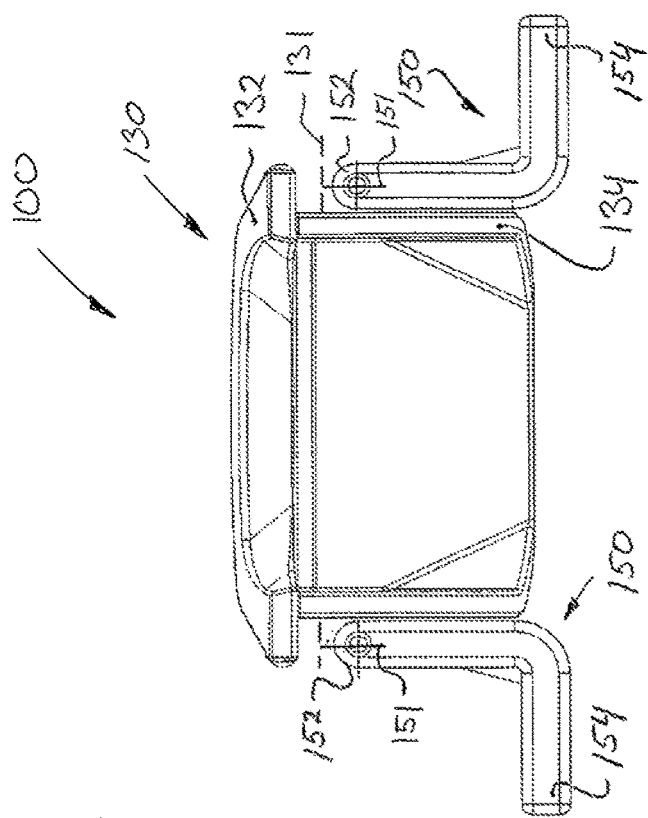
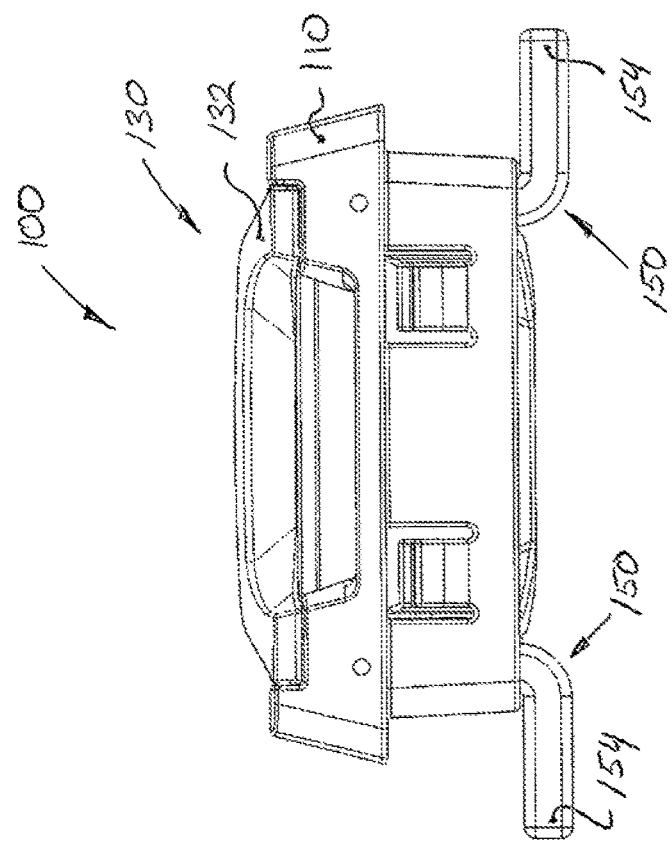
Fig. 13A
Fig. 13B

ATTACHMENT SYSTEM AND METHOD OF USING THE SAME

CROSS-REFERENCE TO RELATED APPLICATIONS

The present patent application claims the benefits of priority of U.S. Provisional Patent Application No. 61/827,299, entitled "Attachment System and Method of Using the Same", and filed at the United States Patent and Trademark Office on May 24, 2013, the content of which is incorporated herein by reference.

FIELD OF THE INVENTION

The present invention generally relates to attachment and locking systems for securing accessories to vehicles.

BACKGROUND OF THE INVENTION

All-terrain vehicles ("ATV" or "ATVs"), utility-terrain vehicle ("UTV" or "UTVs"), side-by-side vehicles ("SSV" or "SSVs"), snowmobiles, and other vehicles, are often equipped with accessories in order to modify the appearance and/or performances of the vehicle.

Such vehicles are often used to perform different kinds of works and/or used in different environments. It is thus generally desirable to be able to easily install and remove accessories to such vehicles. However, most accessories often have to be installed using special mounting kits or assemblies.

There is thus a need for an attachment system which allows the installation and removal of an accessory to a vehicle.

SUMMARY OF THE INVENTION

In accordance with the principles of the present invention, there is provided an attachment system which allows a generally quick yet secured installation of an accessory to a vehicle. The attachment system also allows the removal of the accessory if needed.

The attachment system generally comprises at least one locking mechanism and at least one receiving base. The at least one locking mechanism is generally mounted to, or integral with, the accessory. Similarly, the at least one receiving base is generally mounted to, or integral with, the vehicle.

The locking mechanism generally comprises a housing having pivotally mounted thereto an actuator and at least a pair of locking elements.

The actuator is configured to actuate or displace the locking elements between an unlocked or inoperative position, and a locked or operative position. In that sense, the actuator is pivotally mounted to the housing such as to be pivotable between an open position and a close position. In the open position, the actuator allows the locking elements to pivot back or retract into the housing and into their unlocked position. When pivoted in the close position, the actuator engages the locking elements and causes their displacement into the locked position.

The actuator typically comprises a handle portion configured to be grasped by the human operator, and an actuating portion extending downwardly therefrom, to engage and actuate the locking elements.

The at least one receiving base generally comprises at least one opening configured to receive therein at least a portion of the locking mechanism.

When the locking mechanism is received into the opening of the receiving base, the actuator is pivoted (or closed) such as to displace the locking elements from their inoperative position to their operative position in which they engage the sides of the opening in a locking engagement. To remove the locking mechanism, the actuator is pivoted (or opened) such as to allow the locking elements to pivot from their operative position to their inoperative position in which they no longer engage the sides of the opening.

In typical yet non-limitative embodiments, the housing comprises an upper portion and a lower portion. The lower portion is configured to be received into one of the openings of the receiving base while the upper portion is configured to extend outside the opening. The lower portion generally defines a peripheral shoulder with the upper portion of the housing such as to limit its insertion into the opening. In such embodiments, the lower portion typically has a cross-section which shape is substantially complementary to the shape of the opening in order for the lower portion to properly engage the opening. In that sense, the lower portion is typically slightly tapered to facilitate its insertion into the opening.

In typical yet non-limitative embodiments, the locking elements each comprise an engaging portion configured to engage the sides of the opening. In that sense, the locking elements are generally, though not necessarily, L-shaped hooks.

In typical yet non-limitative embodiments, the locking elements are each provided with a biasing or recall mechanism (e.g. a torsion spring) to bias the locking elements toward their inoperative position.

In typical though non-limitative embodiments, the at least one locking mechanism and the at least one receiving base are made from polymeric material (e.g. plastic).

In typical though non-limitative embodiments, the receiving base is a rack mounted to, or integral with, the vehicle, and which comprises several openings.

In typical though non-limitative embodiments, the vehicle is an all-terrain vehicle ("ATV"), a utility terrain vehicle ("UTV"), a side-by-side vehicle ("SSV"), or a snowmobile.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which:

FIGS. 11A, 12A and 13A are sequential front views of the locking mechanism during the actuation of the actuator and locking elements.

FIGS. 11B, 12B and 13B are sequential front views of the locking mechanism during the actuation of the actuator and locking elements, without the housing.

DETAILED DESCRIPTION OF THE PREFERRED EMBODIMENT

A novel attachment system and a method of using the same will be described hereinafter. Although the invention is described in terms of specific illustrative embodiments, it is to be understood that the embodiments described herein are by way of example only and that the scope of the invention is not intended to be limited thereby.

Figure 1:
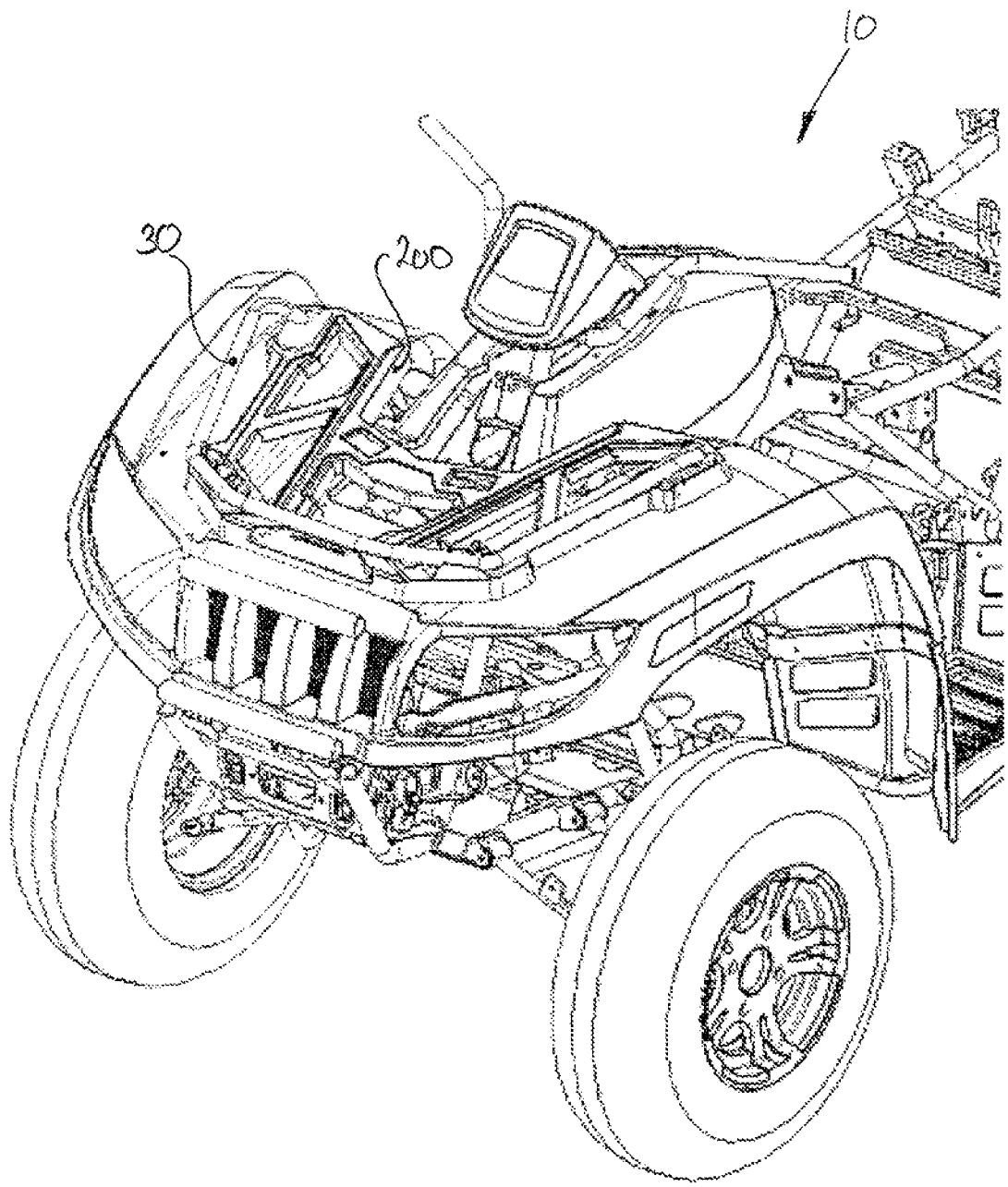
FIG. 1 is a front perspective view of an example of a vehicle having mounted thereto a rail via an embodiment of an attachment system in accordance with the principles of the present invention.

Referring first to FIG. 1, a vehicle 10 is shown having mounted thereto an accessory 30 (i.e. a rail) using an embodiment of an attachment system in accordance with the principles of the present invention.

In FIG. 1, the vehicle 10 is an ATV but the vehicle 10 could be a UTV, a SSV, a snowmobile, or any other vehicles.

Figure 2:
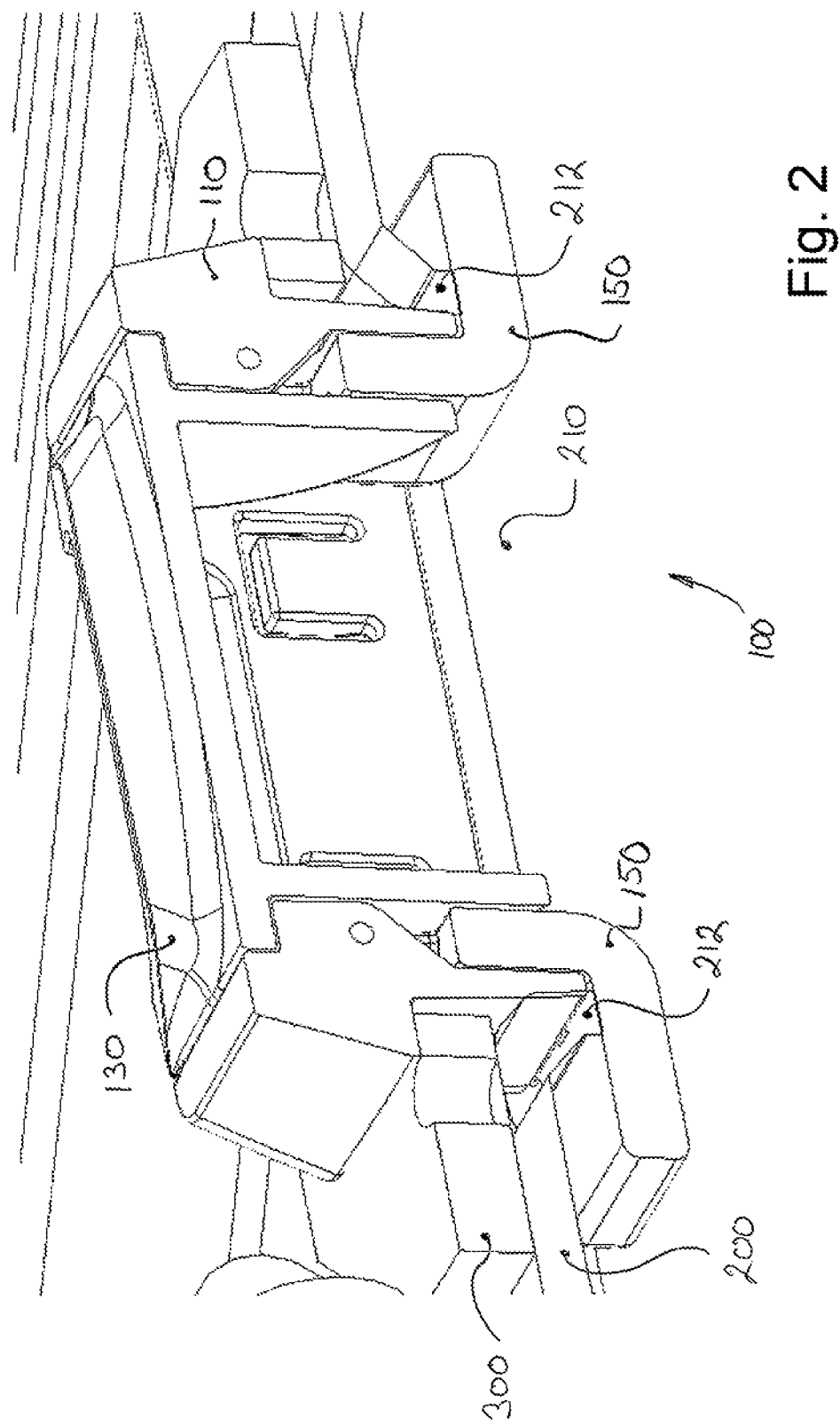
FIG. 2 is an enlarged cross-sectional view of an embodiment of a locking mechanism mounted to a partially shown accessory and secured to a partially shown receiving base.

Referring now to FIG. 2, a cross-sectional view of the attachment system is shown. The attachment system comprises at least one locking mechanism 100 and at least one receiving base 200, the receiving base 200 comprising at least one opening 210.

Figure 15A:
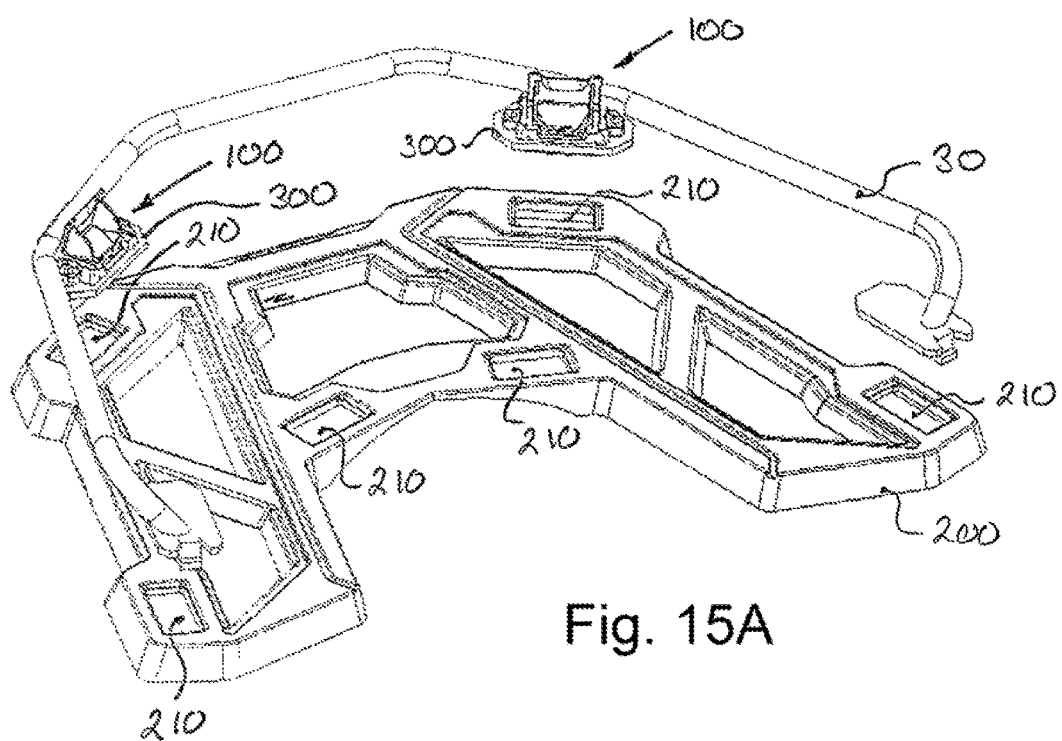
FIGS. 15A and 15B are sequential perspective views of the installation of a rail to a receiving base using the locking mechanisms.
Figure 15B:
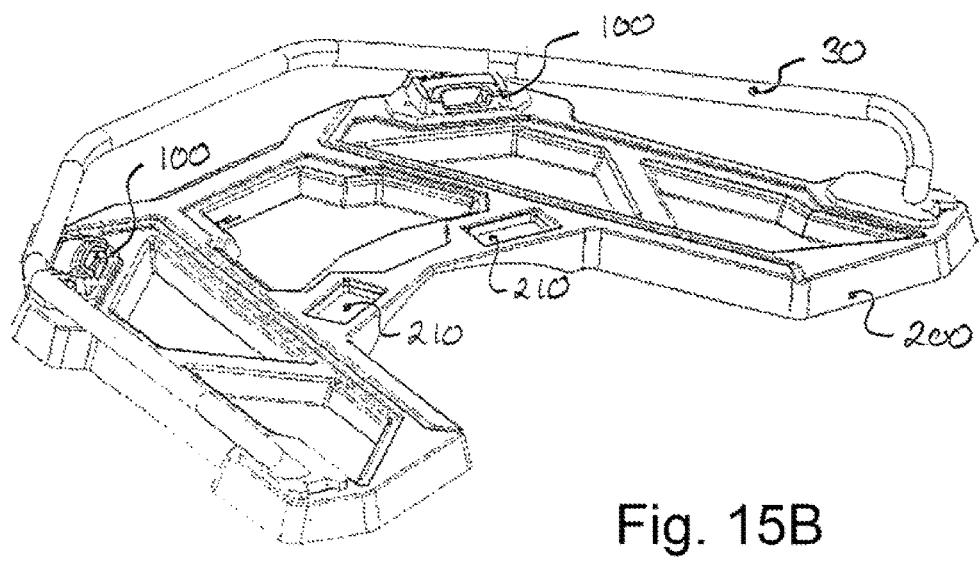

In the present embodiment, the locking mechanism 100 is removably mounted to the accessory 30 and more particularly to a mounting portion 300 thereof (see also FIGS. 15A and 15B).

Referring now to FIGS. 2 to 10, the locking mechanism 100 generally comprises a housing 110, an actuator 130, and a pair of locking elements 150.

Figure 3:
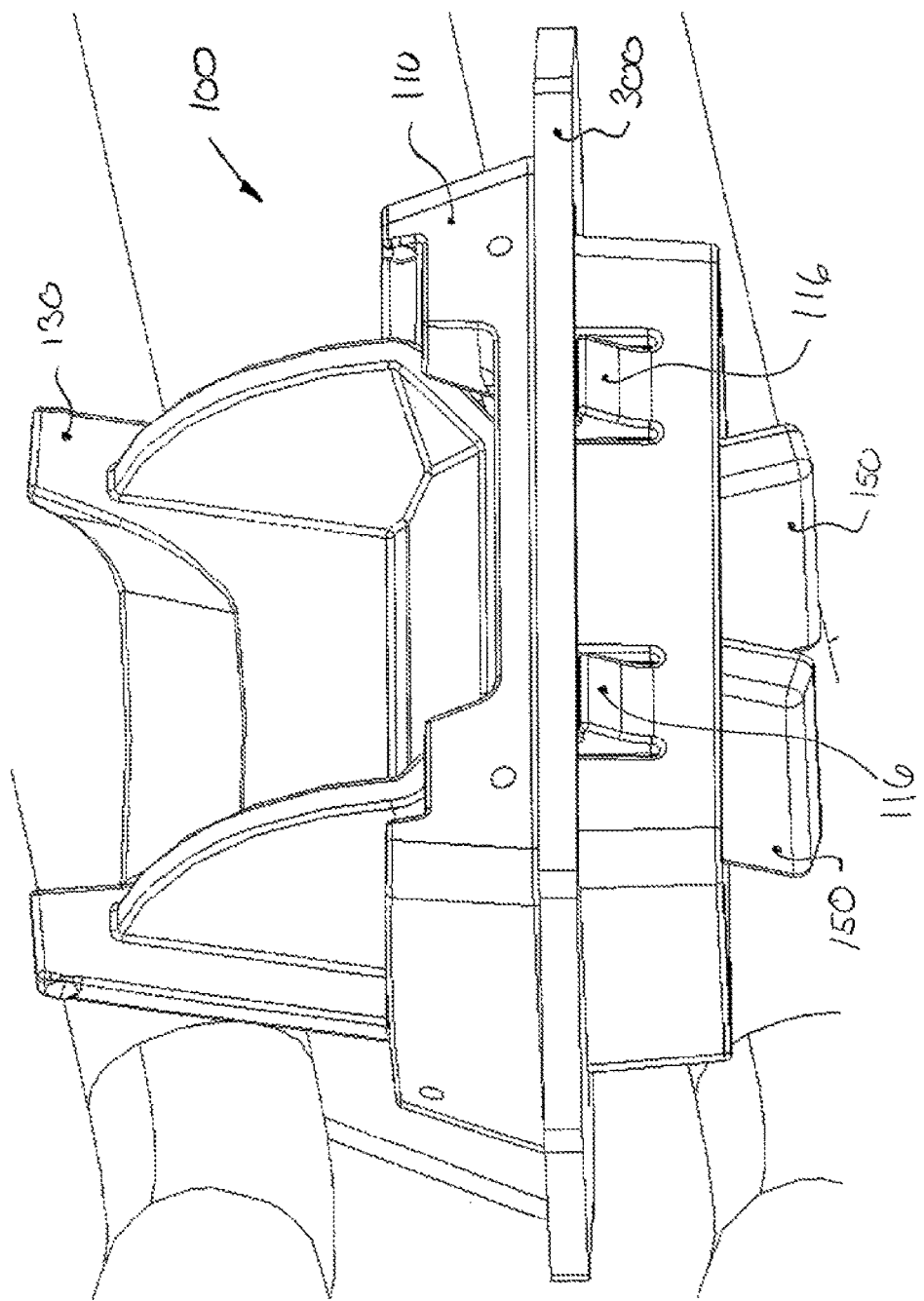
FIG. 3 is a perspective view of the locking mechanism mounted to a partially shown accessory, the actuator of the locking mechanism being in the open position.
Figure 4:
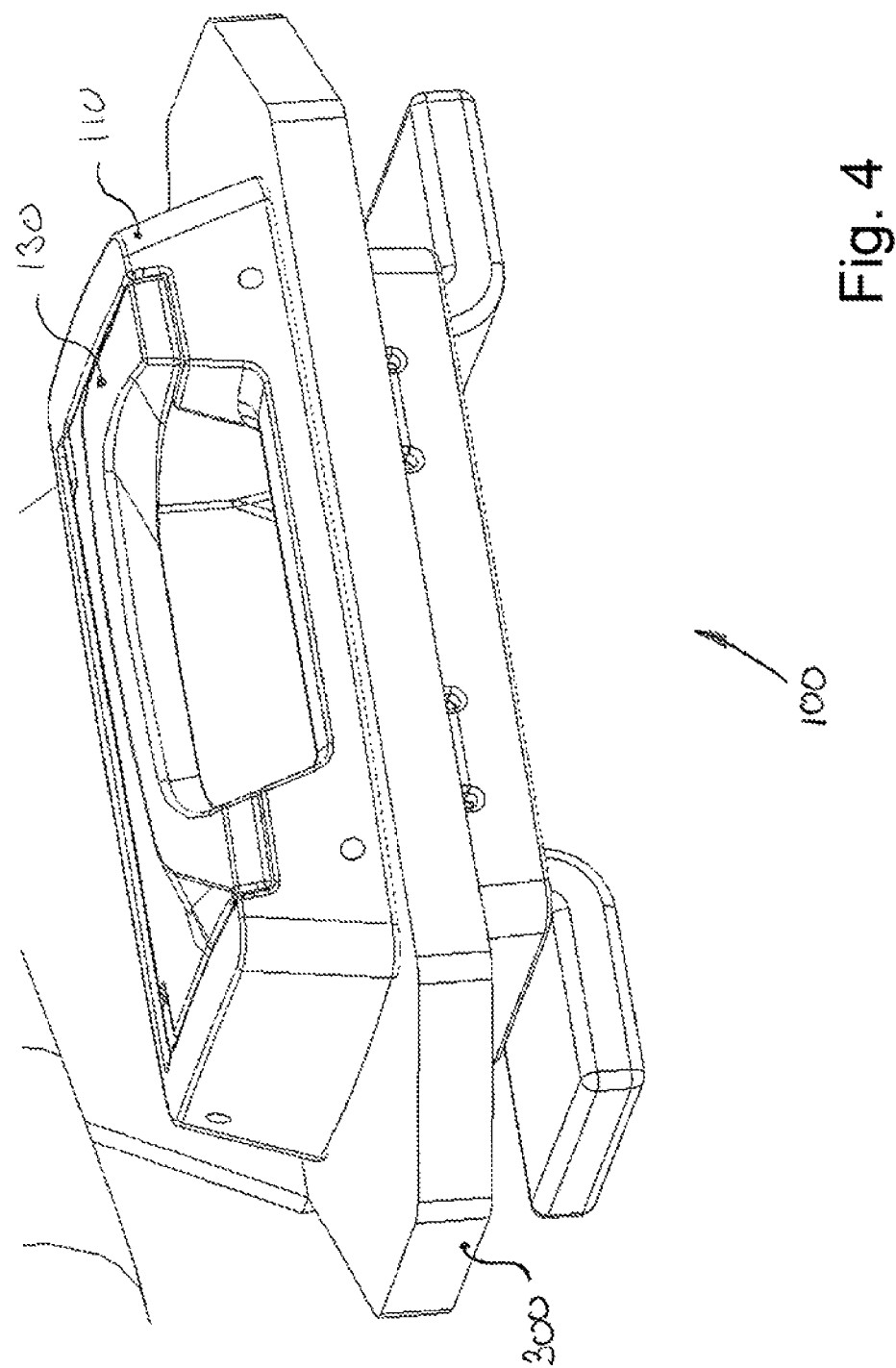
FIG. 4 is a perspective view of the locking mechanism mounted to a partially shown accessory, the actuator of the locking mechanism being in the close position.

The housing 110 generally comprises an upper portion 112 and a lower portion 114 configured to be received into the mounting portion 300 of the accessory 30 and into the opening 210 of the receiving base 200 (see FIGS. 2 to 4). In the present embodiment, as best shown in FIGS. 6 and 7, the lower portion 114 is slightly tapered in order to ease its insertion into the opening 210 of the receiving base 200 during installation.

Figure 6:
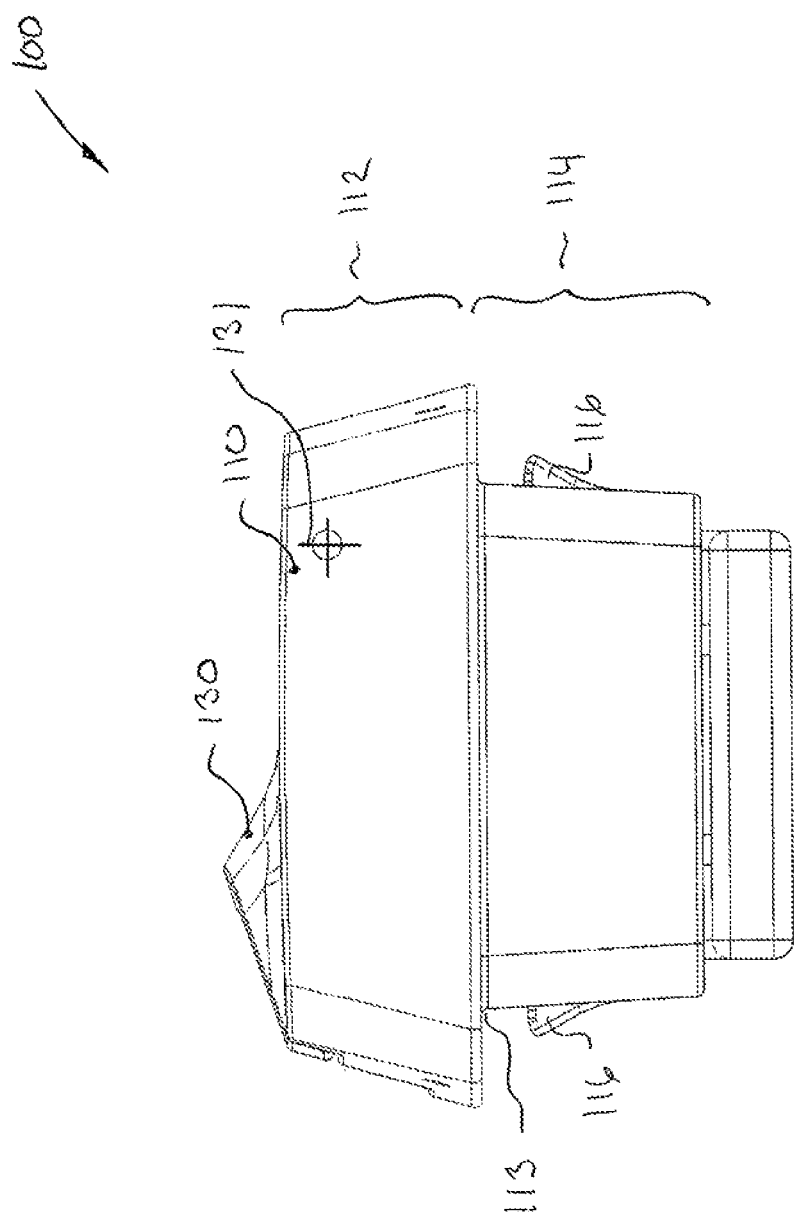
FIG. 6 is a side view of the locking mechanism of FIG. 5.
Figure 7:
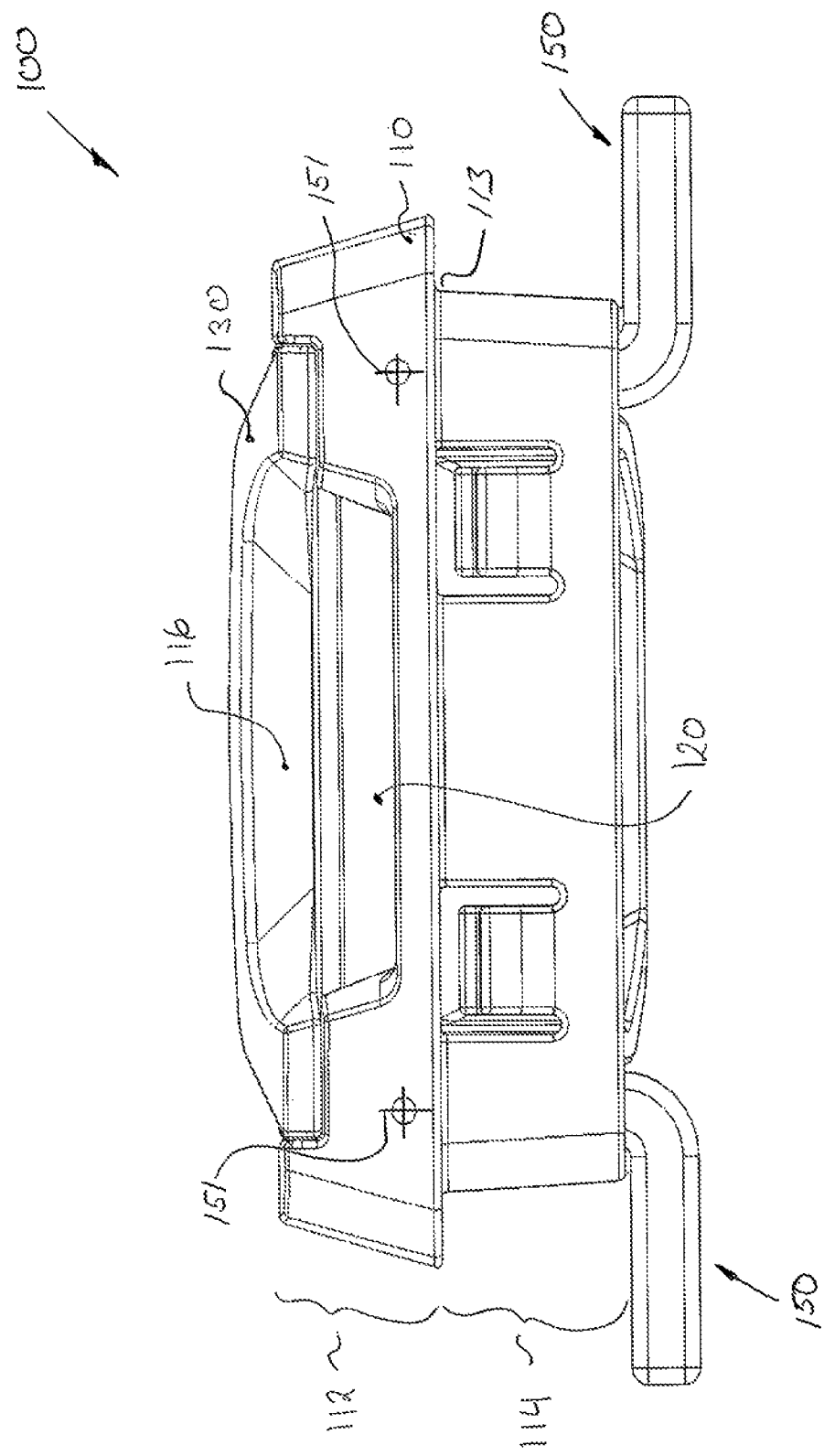
FIG. 7 is a front view of the locking mechanism of FIG. 5.

As best shown in FIGS. 6 and 7, the lower portion 114 defines a peripheral shoulder 113 with the upper portion 112. This shoulder 113 limits the insertion of the housing 110 into the opening 210 of the receiving base and, typically, in the mounting portion 300 of the accessory 30.

In the present embodiment, the locking mechanism 100 is mounted to the accessory 30. In that sense, as mentioned above, the accessory 30 comprises a mounting portion 300 to which the locking mechanism 100 is mounted. To properly secure the locking mechanism 100 to the mounting portion 300, the lower portion 114 of the housing 110 comprises engagement elements 116, e.g. resilient locking hooks, that snap the mounting portion 300 between the resilient locking hooks 116 and the shoulder 113 (see FIG. 3). Hence, in use, the locking mechanism 100 is usually already mounted to the accessory 30 when the accessory 30 is to be mounted to the vehicle 10 (see FIGS. 15A and 15B).

Understandably, in other embodiments, the locking mechanism 100 could be mounted to the mounting portion 300 of the accessory 30 with adhesive or fasteners (e.g. screws, bolts, etc.). In such embodiments, the lower portion 114 of the housing 110 could be devoid of resilient engagement elements 116. However, the housing 110 would have attachment portions (not shown) to secure it to the mounting portion 300 of the accessory 30. In still other embodiments, the locking mechanism 100 could be made integral with the mounting portion 300 of the accessory 30, or with the accessory 30 itself. In such embodiments, there would be no need for the engagement elements 116 as the housing 110 would be made integral with the mounting portion 300 or with the accessory 30.

Figure 8:
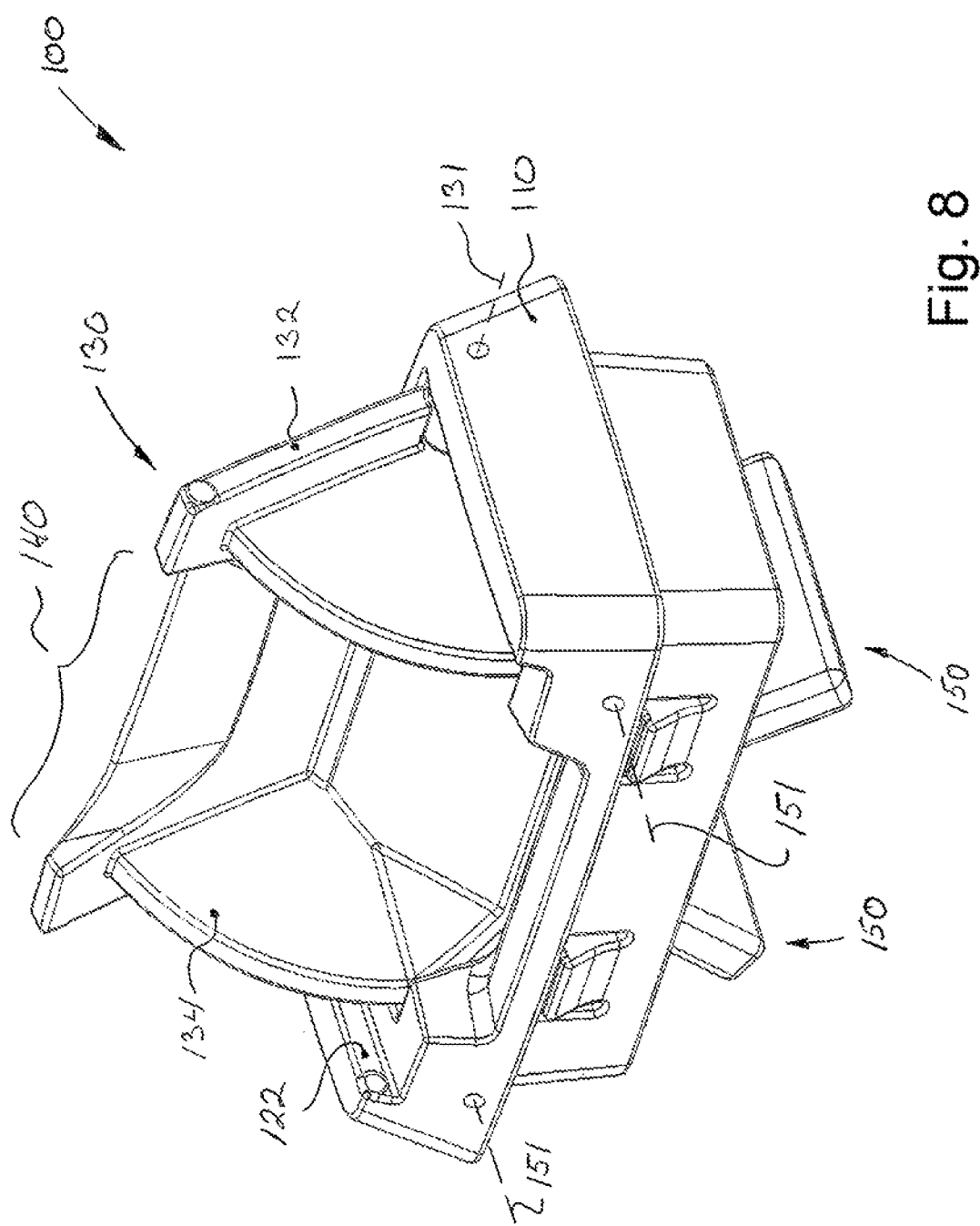
FIG. 8 is a perspective view of the locking mechanism of FIG. 5, the actuator being in the open position.

Referring now to FIGS. 5 to 10, the actuator 130 is pivotally mounted to the housing 110 such that the actuator 130 can be pivoted between a close position (see FIG. 5) and an open position (see FIG. 8). The actuator 130 is configured to actuate the two locking elements 150 such that they lockingly engage the sides 212 of the opening 210 (see FIG. 2).

In that sense, the actuator 130 generally comprises a handle portion 132 and an actuating portion 134 extending downwardly therefrom. In the present embodiment, the handle portion 132 is relatively flat such as to be substantially flush with the rim 122 of the upper portion 112 when the actuator 130 is in the close position (see FIG. 5).

Figure 5:
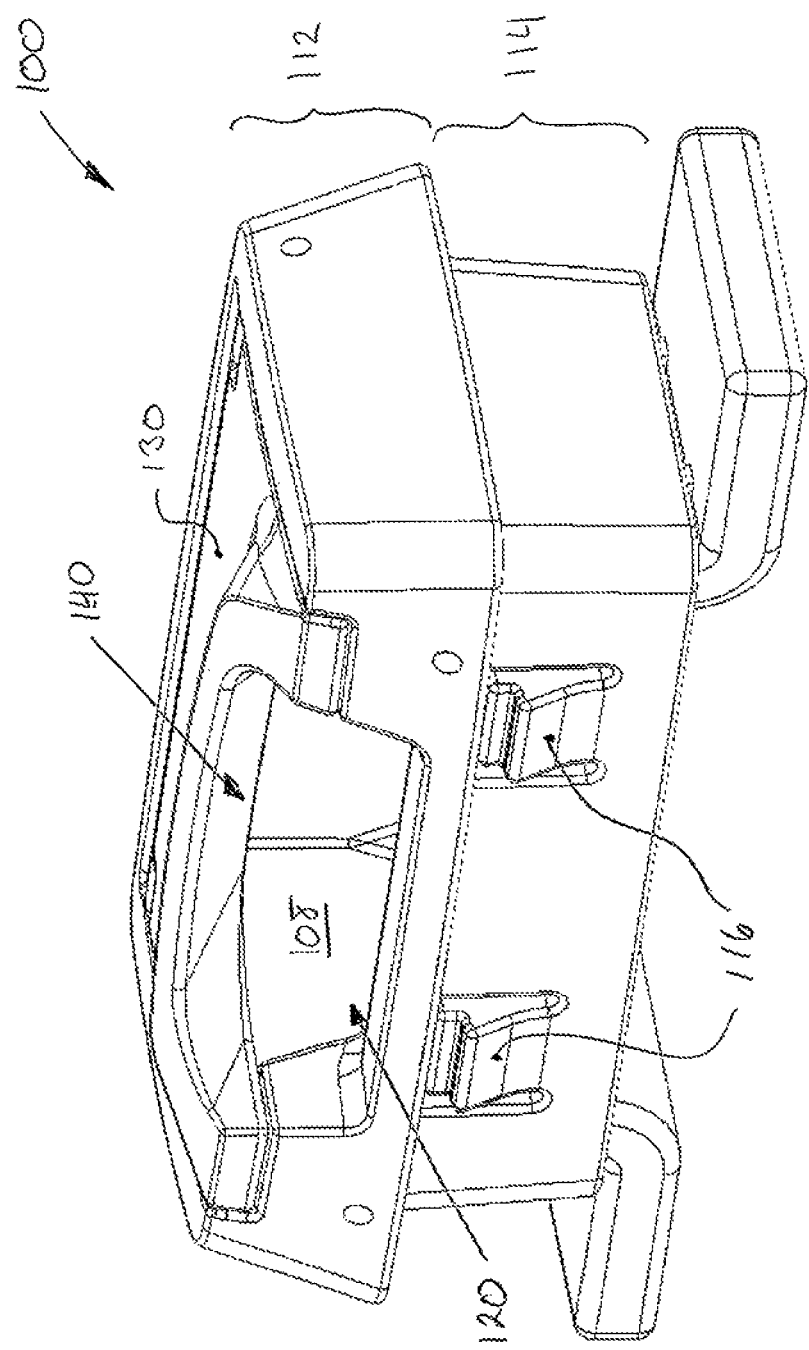
FIG. 5 is a perspective view of the locking mechanism, the actuator being in the close position.

As shown in FIG. 5, the handle portion 132 also comprises a recessed region 140 which is generally aligned with a corresponding recessed region 120 in the upper portion 112 of the housing 110. Together, these recessed regions 120 and 140 form an opening 108 allowing the hand of the human operator to easily grasp the handle portion 132 of the actuator 130 during the opening and closing thereof.

Figure 9:
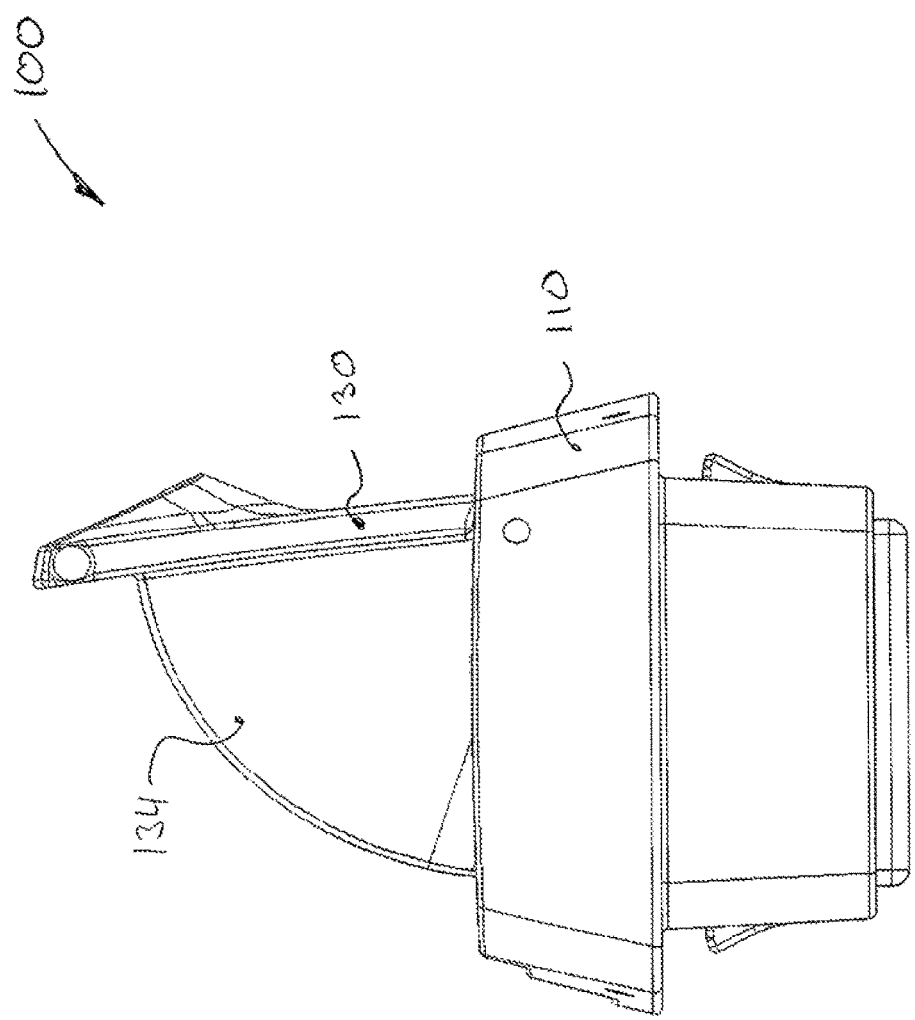
FIG. 9 is a side view of the locking mechanism of FIG. 8.
Figure 10:
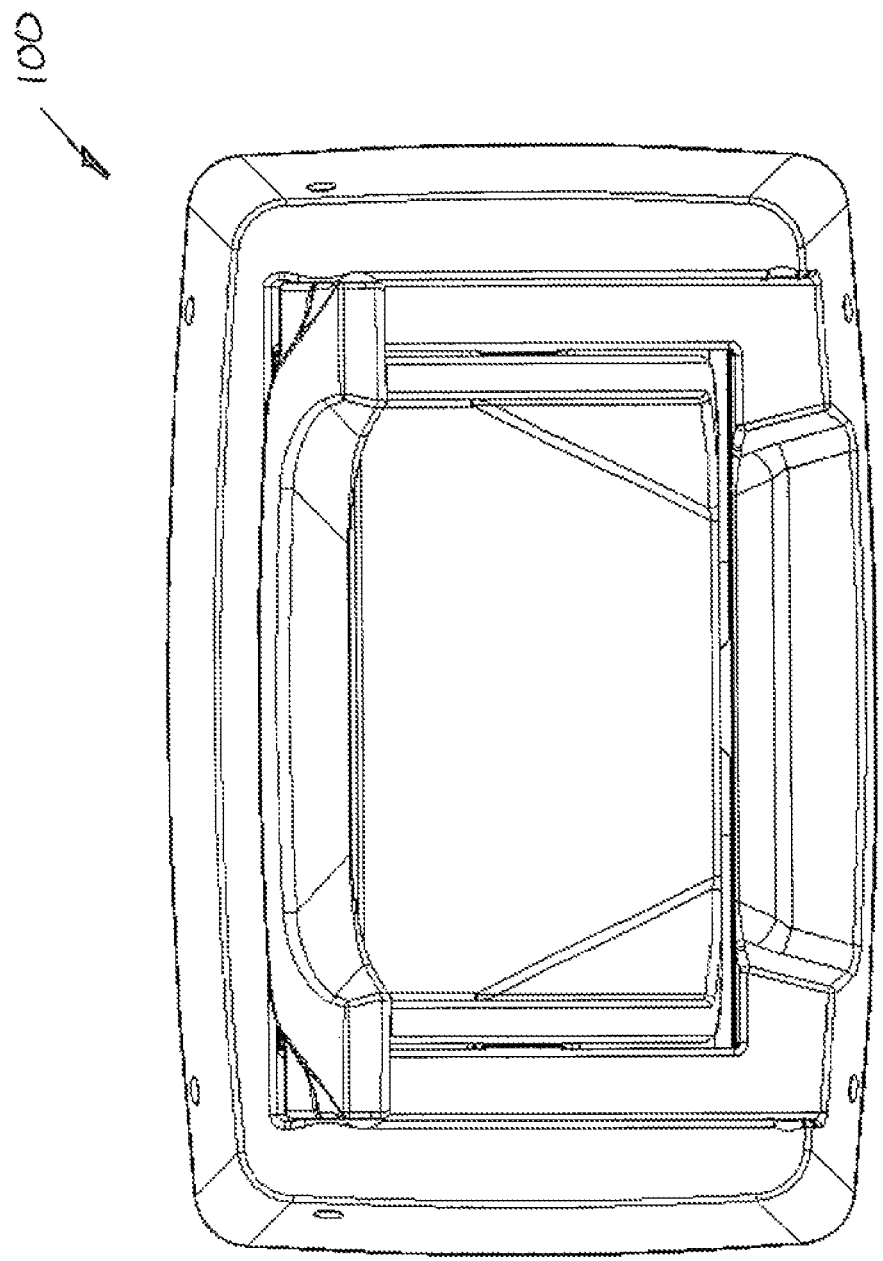
FIG. 10 is a top view of the locking mechanism of FIG. 8.

When viewed from the side, as in FIG. 9, the actuating portion 134 has an overall arcuate shape. The arcuate shape allows a progressive displacement of the locking elements 150.

Still referring to FIGS. 5 to 10, the locking elements 150 are also pivotally mounted to the housing 110 such that they can be pivoted between an inoperative or unlocked position (see FIG. 8) and an operative or locked (see FIG. 5). In the present embodiment, when the locking elements 150 are in their inoperative or unlocked position, they are generally fully retracted within the housing 110 (see also FIGS. 11A and 11B).

In the present embodiment, the locking elements 150 are L-shaped and each comprise a first extremity 152, and a second extremity 154. The first extremity 152 is pivotally mounted to the housing 110 while the second extremity 154 is free.

Though not shown in the figures, the pivotal connections between the first extremities 152 of the locking elements 150 and the housing 110 further comprise recall mechanisms 156 to bias the locking elements 150 toward their unlocked position. In the present embodiment, the recall mechanisms 156 are torsion springs.

Understandably, as the actuator 130 is configured to interact and actuate the locking elements 150, when the actuator 130 is in the open position, the locking elements 150 are in their unlocked position, and when the actuator 130 is in the close position, the locking elements 150 are in their locked position.

As mentioned above, during use, the locking mechanism 100 is typically already mounted to the accessory 30 to be mounted to the vehicle 10 (see FIGS. 15A and 15B). In that sense, the lower portion 114 of the housing 110 is typically already snapped to the mounting portion 300 of the accessory 30 via the engagement elements 116 and the shoulder 113.

To install the accessory 30, the lower portion 114 of the housing 110 is inserted into one of the openings 210 of the receiving base 200. Once the lower portion 114 of the housing 110 is properly received, the actuator 130, which is in the open position, is pivoted by the human operator, such that the actuating portion 134 engages and forces the locking elements 150 to pivot. As the actuator 130 is pivoted from its open position to its close position, the locking elements 150 will correspondingly pivot from their unlocked position to their locked position. In their locked position, the two locking elements 150 engage two sides 212 of the opening 210 in a locking engagement (see FIG. 2).

Referring to FIGS. 11A to 13B, the movements of the actuator 130 and of the locking elements 150 are shown in better details. In FIGS. 11A and 11B, the actuator 130 is in the open position and the locking elements 150 are correspondingly in their unlocked position. In that sense, when the locking elements 150 are in their unlocked position, they are generally fully retracted within the housing 110.

Referring now to FIGS. 12A and 12B, as the actuator 130 is pivoted from the open position toward the close position, the actuating portion 134 of the actuator 130, and more particularly the engaging surface 138, engages the locking elements 150 and causes their displacement toward their locked position. Notably, in the present embodiment, to provide a better and more gradual engagement, the engaging surface 138 of the actuating portion 134 comprises three angular engaging surfaces 138A to 138C (see FIG. 12B). Also, due to the arcuate shape of the actuating portion, the displacement of the locking elements 150 between their unlocked position to their locked position is progressive.

Finally, referring now to FIGS. 13A and 13B, once the actuator 130 is in the close position, the locking elements 150 fully extend outside the housing 110 in their locked position.

As can be seen from FIGS. 11A to 13B, in the present embodiment, the axis of rotation 131 of the actuator 130 is substantially perpendicular to the axes of rotation 151 of the locking elements 150 (see also FIGS. 6-8).

Figure 14B:
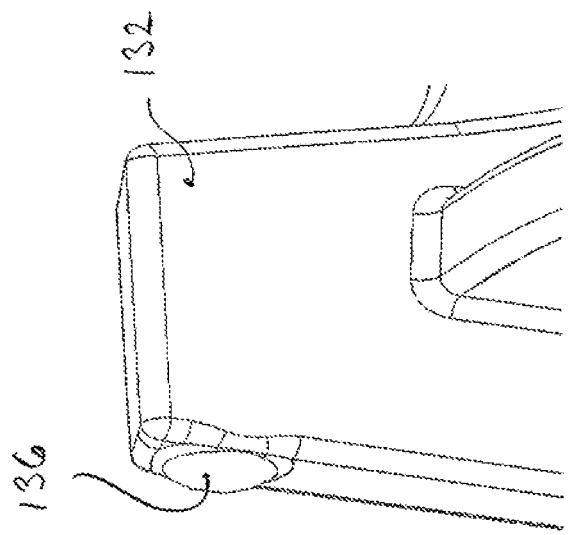
FIGS. 14A and 14B are enlarged views of embodiments of the complementary engagement elements of the housing (FIG. 14A) and actuator (FIG. 14B).
Figure 14A:
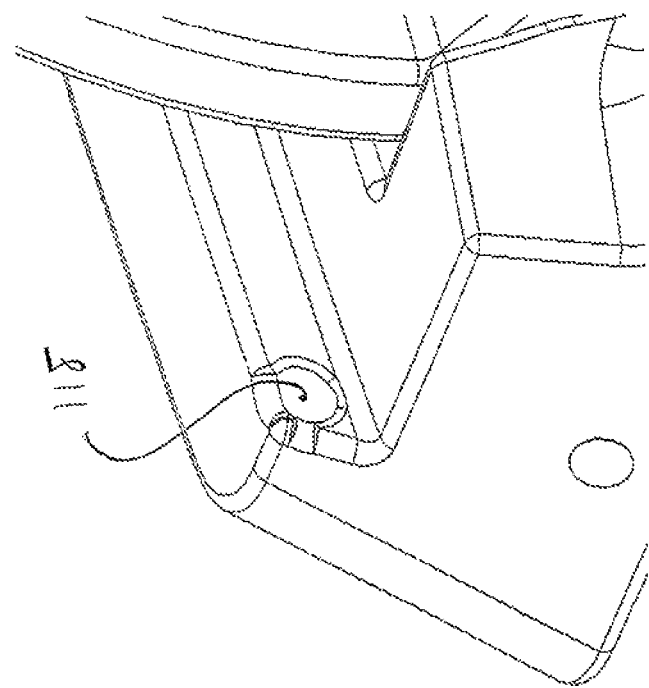

Referring now to FIGS. 14A and 14B, to prevent the actuator 130 from accidentally opening once it is in its close position, the handle portion 132 of the actuator 130 and the rim portion 122 of the top of the upper portion 112 of the housing 110 are provided with corresponding pairs of complementary locking structures 118 and 136 that hold the actuator 130 in close position.

In the present embodiment, locking structures 136 are small nubbles protruding from each side of the handle portion 132 and the locking structures 118 are corresponding small recesses configured to receive small nubbles 136. This configuration of nubbles 136 and recesses 118 allows the handle portion 132 of the actuator 130 to be snapped to the housing 110 when the actuator 130 is in the close position.

Understandably, in other embodiments, the releasable engagement between the handle portion 132 of the actuator 130 and the housing 110 could be different.

To remove the accessory 30, the human operator will unsnap the handle portion 132 of the actuator 130 and pivot the actuator 130 from its close position to its open position.

As the actuator 130 is pivoted from its close position to its open position, the locking elements 150 are free to pivot from their locked position to their unlocked position. In the present embodiment, the locking elements 150 automatically retract under the action of the recall mechanisms 156 (e.g. torsion springs). In that sense, once in the unlocked position, the locking elements 150 will be retracted within the housing 110, allowing the locking mechanism 100 to be withdrawn from the opening 210 of the receiving base 200.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A locking mechanism configured to secure an accessory to a receiving base located on a recreational vehicle, the receiving base having a receiving opening, the receiving opening including two opposed side openings, the locking mechanism comprising:
   a) a housing comprising an upper portion and a lower portion, the upper portion having a first recessed region, the lower portion being shaped and dimensioned to be received into the receiving opening of the receiving base;
   b) an actuator pivotally mounted to the housing, the actuator comprising a handle portion and a locking actuation portion extending downwardly from the handle portion, the handle portion having a second recessed region, at least the handle portion of the actuator being selectively pivotable between an open position and a closed position by a user hand via an opening formed by the first recessed region and the second recessed region, the locking actuation portion having an arcuate shape and an engaging surface;
   c) first and second latches pivotally mounted to the housing, the first and second latches being selectively pivotable between an unlocked position and a locked position;
   wherein the handle portion and the first and second latches are mechanically operatively connected via the locking actuation portion such that when the handle portion is pivoted from the open position to the closed position, the engaging surface of the locking actuation portion engages the first and second latches and causes the first and second latches to pivot from their unlocked positions to their locked positions in which the locking actuation portion is disposed between the first and second latches and the first and second latches engage the two opposed side openings of the receiving opening, and when the handle portion is pivoted from the closed position to the open position, the first and second latches are free to pivot from their locked positions to their unlocked positions.

2. A locking mechanism as claimed in claim 1, wherein the actuator comprises an actuator pivot axis, wherein the first latch comprises a first latch pivot axis, and wherein the second latch comprises a second latch pivot axis.

3. A locking mechanism as claimed in claim 2, wherein the first latch pivot axis and the second latch pivot axis are substantially perpendicular to the actuator pivot axis.

4. A locking mechanism as claimed in claim 1, wherein the first latch comprises a first portion and a second portion extending from the first portion, the first portion being pivotally mounted to the housing, the second portion being configured to engage a first side of the two opposed side openings of the receiving opening of the receiving base when the first locking element is in the locked position, and wherein the second latch comprises a third portion and a fourth portion extending from the third portion, the third portion being pivotally mounted to the housing, the fourth portion being configured to engage another side of the two opposed side openings of the receiving opening of the receiving base when the second latch is in the locked position.

5. A locking mechanism as claimed in claim 4, wherein the first latch is substantially L-shaped, and wherein the second latch is substantially L-shaped.

6. A locking mechanism as claimed in claim 4, wherein the engaging surface is configured to engage the first portion of the first latch and the third portion of the second latch.

7. A locking mechanism as claimed in claim 1, wherein the upper portion and the lower portion of the housing define a shoulder.

8. A locking mechanism as claimed in claim 7, wherein the lower portion of the housing comprises engagement elements, the engagement elements being configured to engage an attachment portion of the accessory.

9. A locking mechanism as claimed in claim 1, wherein the handle portion of the actuator further includes nubbles protruding from each side of the handle portion and the upper portion of the housing comprises corresponding recesses, the nubbles and recesses providing locking engagement between the actuator and the upper portion of the housing when the handle portion is in the closed position.

10. A locking mechanism as claimed in claim 1, wherein the housing, the actuator and the first and second latches are substantially made from polymeric material.

11. An attachment system configured to secure an accessory to a recreational vehicle, the attachment system comprising:
 a) at least one receiving base locatable on the vehicle, the at least one receiving base having at least one receiving opening, the at least one receiving opening including two opposed side openings;
 b) at least one locking mechanism configured to be located on the accessory, the at least one locking mechanism comprising:
  i. a housing comprising an upper portion and a lower portion, the upper portion comprising a first recessed region, the lower portion being configured to be received into the at least one receiving opening of the at least one receiving base;
  ii. an actuator pivotally mounted to the housing, the actuator comprising a handle portion and a locking actuation portion extending downwardly from the handle portion, the handle portion comprising a second recessed region, at least the handle portion of the actuator being selectively pivotable between an open position and a closed position by a user hand via an opening formed by the first recessed region and the second recessed region, the locking actuation portion having an arcuate shape and comprising an engaging surface;
  iii. first and second latches pivotally mounted to the housing, the first and second latches being selectively pivotable between an unlocked position and a locked position;
   wherein the actuator and the first and second latches are mechanically operatively connected via the locking actuation portion such that when the handle portion is pivoted from the open position to the closed position, the engaging surface of the locking actuation portion engages the first and second latches and causes the first and second latches to pivot from their unlocked positions to their locked positions, and when the handle portion is pivoted from the closed position to the open position, the first and second latches are free to pivot from their locked positions to their unlocked positions;
   wherein when the lower portion is received into the at least one receiving opening of the at least one receiving base, and when the first and second latches are in their locked positions, the locking actuation portion is disposed between the first and second latches and the first and second latches engage the two opposed side openings of the at least one receiving opening of the at least one receiving base.

12. An attachment system as claimed in claim 11, wherein the actuator comprises an actuator pivot axis, wherein the first latch comprises a first latch pivot axis, and wherein the second latch comprises a second latch pivot axis.

13. An attachment system as claimed in claim 12, wherein the first latch pivot axis and the second latch pivot axis are substantially perpendicular to the actuator pivot axis.

14. An attachment system as claimed in claim 11, wherein the upper portion and the lower portion of the housing define a shoulder.

15. An attachment system as claimed in claim 14, wherein the lower portion of the housing comprises engagement elements, and where the engagement elements and the shoulder are configured to cooperate to engage an attachment portion of the accessory.

16. An attachment system as claimed in claim 11, wherein the at least one receiving base comprises a plurality of receiving openings.

17. An attachment system as claimed in claim 11, wherein the at least one locking mechanism is mounted to the accessory.

18. An attachment system as claimed in claim 11, wherein the at least one locking mechanism is integral with the accessory.

19. An attachment system as claimed in claim 11, wherein the at least one receiving base is mounted to the recreational vehicle.

20. An attachment system as claimed in claim 11, wherein the at least one receiving base is integral with the recreational vehicle.

* * * * *